Feb. 20, 1934.    J. T. MORGAN    1,948,124
WATERLESS COOKING UTENSIL
Original Filed July 23, 1931
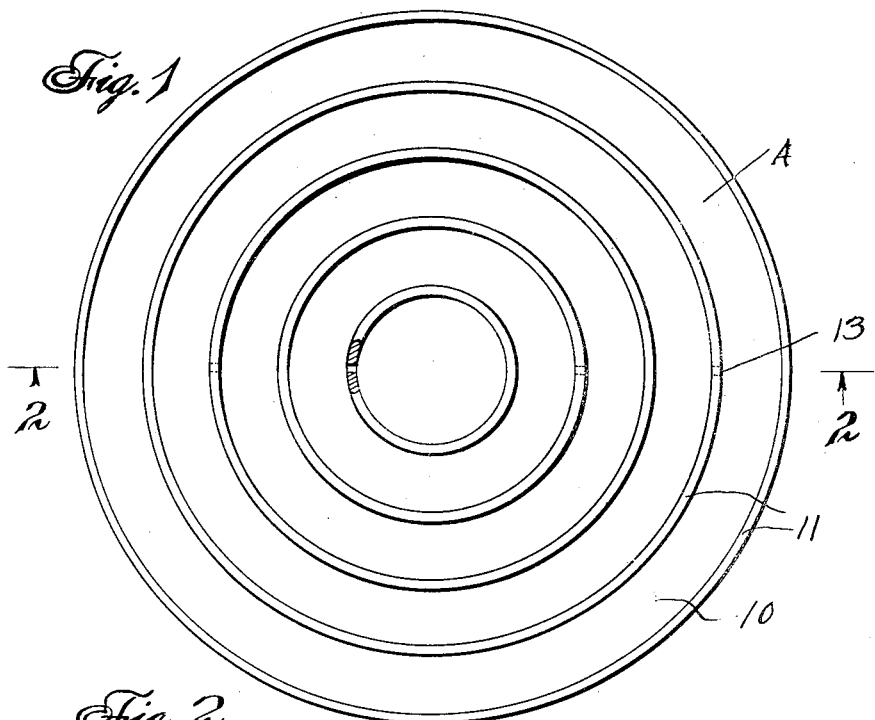
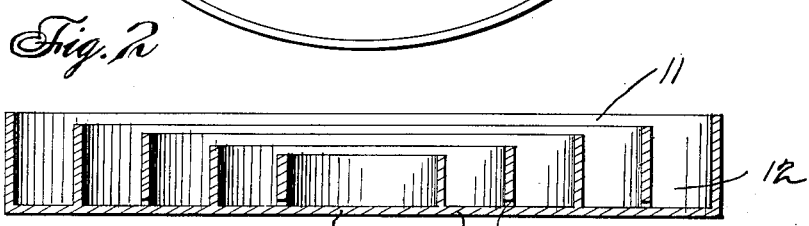
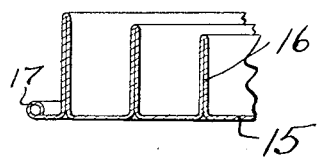 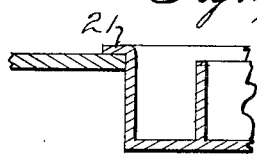
Inventor
John T. Morgan
By Young & Young
Attorneys Patented Feb. 20, 1934

1,948,124

UNITED STATES PATENT OFFICE 1,948,124

WATERLESS COOKING UTENSIL

John T. Morgan, Columbus, Ohio

Application July 23, 1931, Serial No. 552,696
Renewed July 15, 1933

2 Claims. (Cl. 53—1)

This invention appertains to the culinary art and more particularly to an attachment for use in the so-called waterless cooking of foods.

One of the primary objects of my invention is to provide an attachment upon which ordinary types of cooking vessels can be placed, the attachment permitting the effective use of said ordinary cooking vessels for the cooking of food without water in their own juices.

Another salient object of my invention is the provision of an attachment for ordinary cooking vessels for use in waterless cooking adapted to be interposed between the cooking vessel and the source of heat, the attachment including a plurality of concentric rings or flanges carried by a common base, whereby a plurality of different sized cooking vessels can be efficiently used in conjunction with the attachment.

A further prime object of my invention is the provision of means whereby water can be used in conjunction with the attachment and in the chambers defined by the spaced flanges or rings, the flanges or rings having oppositely disposed ports therein adjacent to the bottoms thereof, whereby the seepage of water from one chamber to the other is permitted, so that as the water evaporates in the central chamber, the same can be replaced by the water from the other chambers.

A further object of my invention is to provide a cooking device which cannot only be successfully used in conjunction with ordinary types of cooking vessels, but which can be used alone for the broiling of steaks, chops, etc., the toasting of bread and the like.

A still further object of my invention is to provide an improved device of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawing, in which:

Figure 1 is a top plan view illustrating one preferred embodiment of my invention;

Figure 2 is a diametric section through the same taken on the line 2—2 of Figure 1, looking in the direction of the arrows;

Figure 3 is a detail fragment sectional view illustrating another form of my invention, which is susceptible of being made from comparatively thin sheet metal;

Figure 4 is a fragmentary sectional view illustrating a further form of my invention particularly adapted for use as standard equipment on stoves.

Referring to the drawing in detail, wherein similar reference characters designate corresponding parts throughout the several views, the letter "A" generally indicates one form of my invention, which as shown embodies a flat disc-shaped bottom wall or plate 10, having formed on its upper face a plurality of upstanding concentrically disposed rings or flanges 11. These rings or flanges 11 define annular chambers 12 therebetween. If preferred, the flanges can be made in different heights, and as clearly shown in Figure 2 of the drawing, the flanges grow progressively shorter in height from the outermost flange or ring toward the innermost flange or ring.

While I have stated that the flanges are annular, it is to be understood that the particular configuration of the flanges 11 are not important as the same could be made in various shapes, such as square or oblong.

While it is preferable to make the device "A" of heavy cast aluminum, it is to be understood that the attachment can be made in any other preferred manner and out of any desired material.

In use of my attachment, the same is placed on the stove directly over the source of heat and the cooking vessel containing the food is placed thereon. The vessel is placed on an appropriate sized ring and it is obvious that the rings or flanges will hold the receptacle spaced from the bottom plate 10 of the attachment and above the burner or other source of heat.

The device, is, therefore, particularly adapted for use in the so called waterless cooker.

In some instances, it may be desirable to place water in the attachment and it is obvious that the space between the flanges 11 will form chambers for receiving the water. The innermost chambers being subjected to the greatest amount of heat will naturally cause the water to evaporate quicker at this point and I, therefore, provide ports 13 in the flanges to allow the water from the outermost chambers to flow toward the innermost chambers, so as to replace the water that has evaporated or turned into steam. The ports 13 are of a relatively small character and are oppositely disposed relative to one another. That is, the port in the innermost ring is arranged diametrically opposite the port in the adjacent ring, and the port in the second mentioned ring is arranged diametrically opposite the port in the next adjacent ring and so on.

If desired, the device can be constructed from relatively thin sheet metal and folded or pressed into shape. In Figure 3, I have illustrated such a construction and it is to be noted from this figure that a sheet metal plate 15 is utilized and the same crimped to provide the series of upstanding flanges 16. Due to the formation of the attachment in the form shown in Figure 3, each flange consists of a double ply of metal which adds to the rigidity of the flanges and the entire apparatus.

In order to eliminate the forming of sharp edges and to further aid in the strengthening of the device, the marginal edge of the plate can be rolled to provide a bead 17, as shown.

Where my device is to be used as standard equipment on stoves of any type, I can provide an outstanding flange 21 formed on the upper edge thereof. This is illustrated in Figure 4 of the drawing, and as shown in this figure, the device is inserted in the top of the stove, and the flange 21 rests thereon.

The graduation of the flanges or rings 11 as to height serve the purpose of holding the receptacles above the rings or flanges when in use. That is, if a relatively large receptacle is being used, the same will rest on the outermost flange or ring 11 and be held above and spaced from the remaining flanges or rings.

In effect the rings form independent insulating chambers for the different sized receptacles and effectively protect the particular size of cooking vessel used, from the direct heat, and from contact with more than one flange.

The many uses to which my device can be put, besides being used under ordinary cooking vessels, will readily suggest themselves to skilled housewives.

For instance, the device is extremely useful in the broiling of meat, toasting of bread, cooking of griddle cakes and the like. Where the device is used for the cooking of griddle or hot cakes, the device is turned over so as to dispose the flat cooking surface uppermost. This allows the effective cooking of the cakes, the toasting of the bread and the like. If desired, the flat bottom wall can be extended, as suggested in Figure 3, to form a larger flat cooking area.

While I have stated that the ports 13 are of a small character, obviously these ports can be made in any desired shape.

Changes in details may be made without departing from the spirit or the scope of this invention, but what I claim as new is:

1. A culinary device for use with vessels for cooking foods in their own juices comprising a bottom plate, a series of up-standing flanges arranged in spaced relation and one within the other carried by the bottom plate, the bottom plate and flanges defining water receiving chambers there-between, and ports formed in certain of the flanges to permit the seepage of water from the outermost chambers to the innermost, the outer flange being formed continuous and imperforate.

2. A culinary device comprising a flat bottom wall and a series of upstanding spaced flanges, the flanges being graduated as to height from the outermost flange to the innermost flange, whereby cooking vessels of different sizes can be associated with the device and held in spaced relation to the bottom plate and the other flanges not in use, said flanges being continuous and acting in conjunction with the bottom wall and the different sized receptacles to form, a series of heat insulation chambers between the direct heat and the receptacles, said chambers also forming water receiving compartments, the outer flange being imperforate, and the inner flanges being provided with openings whereby water will seep from the outermost compartments toward the innermost compartments.

JOHN T. MORGAN.